(12) United States Patent
Chong et al.

(10) Patent No.: US 9,891,465 B2
(45) Date of Patent: Feb. 13, 2018

(54) LIQUID CRYSTAL DISPLAY APPARATUS AND METHOD OF MANUFACTURING THE SAME

(71) Applicant: Samsung Display Co., Ltd., Yongin-si, Gyeonggi-do (KR)

(72) Inventors: Joonggun Chong, Yongin-si (KR); Hyungjune Kim, Yongin-si (KR); Hyoungcheol Lee, Yongin-si (KR); Wansoon Im, Yongin-si (KR); Jonghak Hwang, Yongin-si (KR)

(73) Assignee: Samsung Display Co., Ltd. (KR)

( * ) Notice: Subject to any disclaimer, the term of this patent is extended or adjusted under 35 U.S.C. 154(b) by 219 days.

(21) Appl. No.: 14/876,641

(22) Filed: Oct. 6, 2015

(65) Prior Publication Data

US 2016/0238881 A1    Aug. 18, 2016

(30) Foreign Application Priority Data

Feb. 13, 2015   (KR) .................. 10-2015-0022713

(51) Int. Cl.
*G02F 1/1335*   (2006.01)
*F21V 8/00*   (2006.01)

(52) U.S. Cl.
CPC ...... *G02F 1/133528* (2013.01); *G02B 6/0011* (2013.01); *G02F 1/133512* (2013.01); *G02F 1/133514* (2013.01); *G02F 2001/133538* (2013.01); *G02F 2001/133548* (2013.01); *G02F 2201/52* (2013.01); *G02F 2203/01* (2013.01)

(58) Field of Classification Search
CPC ............ G02F 1/1335; G02F 1/133528; G02F 2001/133531; G02F 2001/133548; G02F 2001/133538
See application file for complete search history.

(56) References Cited

U.S. PATENT DOCUMENTS

| 6,481,851 | B1* | 11/2002 | McNelley .......... G02B 27/2292 345/5 |
| 9,164,211 | B2* | 10/2015 | Yim ..................... H01L 51/5281 |
| 9,236,016 | B2* | 1/2016 | Huang ............... G02F 1/133533 |
| 2006/0072055 | A1* | 4/2006 | Ukawa ............... G02F 1/133514 349/114 |
| 2008/0252824 | A1 | 10/2008 | Kadowaki et al. |

(Continued)

FOREIGN PATENT DOCUMENTS

| JP | 2006-309185 A | 11/2006 |
| KR | 10-839414 B1 | 6/2008 |

(Continued)

*Primary Examiner* — Timothy L Rude
(74) *Attorney, Agent, or Firm* — Innovation Counsel LLP

(57) ABSTRACT

Provided is a liquid crystal display (LCD) apparatus including: a first substrate including a first region realizing an image and a second region which transmits external light; a second substrate facing the first substrate; a liquid crystal layer disposed between the first substrate and the second substrate; a first polarizer arranged on a surface of the first substrate; and a second polarizer arranged between the second substrate and the liquid crystal layer and comprising a first polarization region positioned in the first region and a second polarization region positioned in the second region and having a polarization axis different from a polarization axis of the first polarization region.

14 Claims, 14 Drawing Sheets

(56) References Cited

U.S. PATENT DOCUMENTS

| | | | |
|---|---|---|---|
| 2008/0259232 A1 | 10/2008 | Kim et al. | |
| 2012/0327331 A1* | 12/2012 | Yim | G02F 1/1362 349/62 |
| 2013/0300986 A1 | 11/2013 | Kang | |
| 2014/0293192 A1* | 10/2014 | Hatano | G02B 26/005 349/69 |
| 2015/0015834 A1* | 1/2015 | Yim | G09G 3/32 349/98 |
| 2015/0042896 A1* | 2/2015 | Lee | G02F 1/1347 348/790 |
| 2015/0168776 A1* | 6/2015 | Song | H01L 51/5281 349/62 |
| 2015/0346522 A1* | 12/2015 | Hilarius | G02F 1/0136 359/259 |
| 2016/0197131 A1* | 7/2016 | Park | H01L 27/3267 349/139 |
| 2016/0343285 A1* | 11/2016 | Yamaguchi | G02F 1/133536 |
| 2016/0357068 A1* | 12/2016 | Yang | G02F 1/133504 |

FOREIGN PATENT DOCUMENTS

| | | |
|---|---|---|
| KR | 10-2012-0047638 A | 5/2012 |
| KR | 10-2013-0126141 A | 11/2013 |
| KR | 10-2014-0069771 A | 6/2014 |

\* cited by examiner

LIQUID CRYSTAL DISPLAY APPARATUS AND METHOD OF MANUFACTURING THE SAME

RELATED APPLICATION

This application claims the benefit of Korean Patent Application No. 10-2015-0022713, filed on Feb. 13, 2015, in the Korean Intellectual Property Office, the disclosure of which is incorporated herein in its entirety by reference.

BACKGROUND

1. Field

A liquid crystal display (LCD) apparatus and a method of manufacturing the same are provided, and more particularly, a see-through LCD apparatus capable of recognizing an image realized by a display apparatus and an external background, and a method of manufacturing the same are provided.

2. Description of the Related Art

With the development in various electronic devices such as mobile phones, personal digital assistants (PDAs), and large TVs, demand for flat panel display apparatuses that may be applied thereto has increased. Among flat panel display apparatuses, a liquid crystal display (LCD) apparatus has the following advantages: low power consumption, the ability to easily display dynamic images, a high contrast ratio, etc.

The LCD apparatus includes a liquid crystal layer disposed between two substrates and has a transmittance which is adjusted based an orientation of liquid crystals which is controlled by applying an electric field to the liquid crystal layer.

Recently, research into a see-through LCD apparatus, via which a user may recognize an image realized by the LCD apparatus as well as an external background, has been conducted.

SUMMARY

A see-through liquid crystal display (LCD) apparatus having an improved transmittance and method of manufacturing the same are provided.

Additional aspects will be set forth in part in the description which follows and, in part, will be apparent from the description, or may be learned by practice of the presented embodiments.

An LCD apparatus includes: a first substrate including a first region realizing an image and a second region which transmits external light; a second substrate facing the first substrate; a liquid crystal layer disposed between the first substrate and the second substrate; a first polarizer arranged on a surface of the first substrate; and a second polarizer arranged between the second substrate and the liquid crystal layer and including a first polarization region positioned in the first region and a second polarization region positioned in the second region and having a polarization axis different from a polarization axis of the first polarization region.

The polarization axis of the first polarization region may be substantially perpendicular to the polarization axis of the second polarization region.

The polarization axis of the first polarizer may be substantially parallel to the polarization axis of the second polarization region.

The second polarizer may include a wire-grid polarizer (WGP).

The second polarizer may include a region where the first polarization region overlaps the second polarization region.

The region where the first polarization region overlaps the second polarization region may correspond to a boundary line between the first region and the second region.

The LCD apparatus may further include color filters respectively arranged in a first sub-pixel, a second sub-pixel, and a third sub-pixel and converting incident light into different colored light, wherein the first sub-pixel, the second sub-pixel, and the third sub-pixel are included in the first region.

The region where the first polarization region overlaps the second polarization region may correspond to a region between the color filters.

The color filters may be arranged between the second polarizer and the liquid crystal layer.

The first region and the second region may be alternately arranged in one direction.

The first region and the second region may be arranged in a checkered pattern.

The LCD apparatus may further include a pixel electrode and a common electrode which generate an electric field in the liquid crystal layer, and the pixel electrode may not be arranged in the second region.

The LCD apparatus may further include a light guide panel arranged on a surface opposite to a surface of the first substrate which faces the second substrate, and a light source unit configured to emit light toward the light guide panel.

The light source unit may be arranged to face a side surface of the light guide panel, and the light guide panel is formed of a material which transmits light.

A method of manufacturing an LCD apparatus, includes: arranging a first substrate including a first region realizing an image and a second region transmitting light; forming, on a second substrate, a second polarizer including a first polarization region and a second polarization region having a polarization axis substantially perpendicular to a polarization axis of the first polarization region; and aligning the first and second substrates and attaching the first and second substrate to each other such that the second polarizer faces the first substrate and the positions of the first and second polarization regions respectively correspond to the positions of the first and second regions.

The forming of the second polarizer may include: forming, on an entire surface of the second substrate, a polarizer having a first polarization axis; forming a first polarization region by patterning the polarizer having the first polarization axis; forming, over the entire surface of the second substrate, a polarizer having a second polarization axis different from the first polarization axis such that the polarizer having the second polarization axis covers the first polarization region; and forming a second polarization region by removing, from the polarizer having the second polarization axis, at least some portions of a region which covers the first polarization region.

The method may further include forming a first polarizer on a surface of the first substrate.

A polarization axis of the first polarizer may be substantially parallel to the polarization axis of the second polarization region.

The second polarizer may include a WGP.

The forming of the second polarization region may include forming the second polarization region such that at least some portions of the region which covers the first polarization region are not removed.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1A:
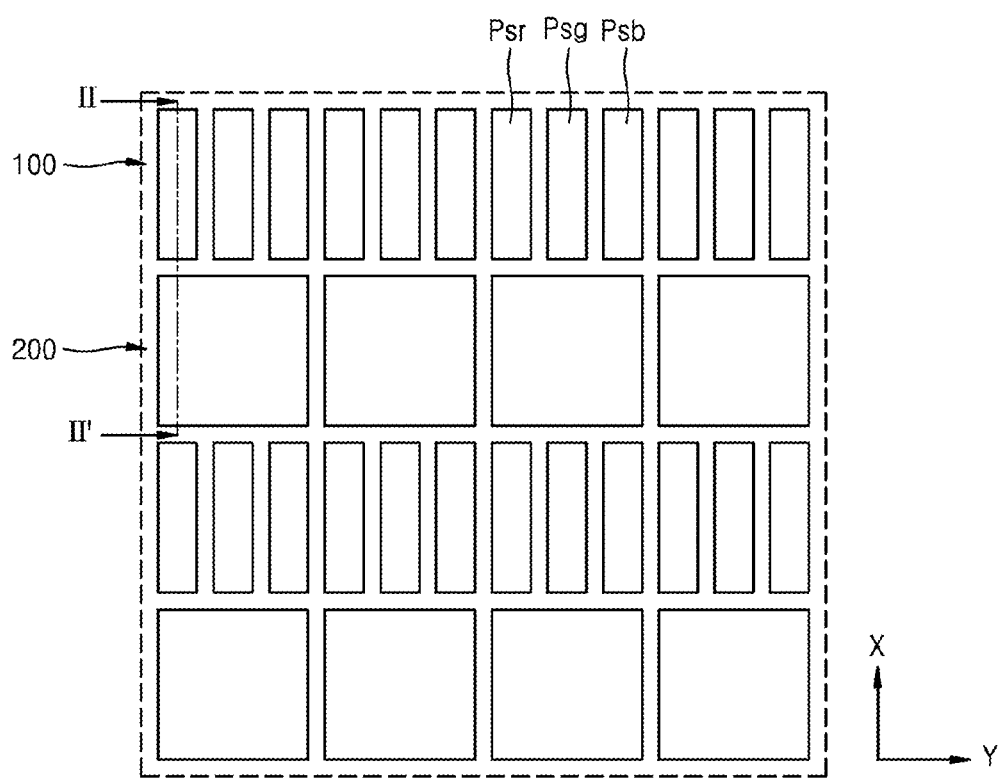
FIG. 1A is a schematic plan view of a liquid crystal display (LCD) apparatus according to an exemplary embodiment.

As the inventive concept allows for various changes and numerous exemplary embodiments, particular exemplary embodiments will be illustrated in the drawings and described in detail in the written description. The inventive concept may, however, be embodied in many different forms and should not be construed as being limited to the exemplary embodiments set forth herein; rather, these exemplary embodiments are provided so that this inventive concept will be thorough and complete, and will fully convey the concept of the inventive concept to those skilled in the art.

It will be understood that although the terms "first", "second", etc. may be used herein to describe various components, these components should not be limited by these terms. These components are only used to distinguish one component from another.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Sizes of components in the drawings may be exaggerated for convenience of explanation. In other words, because sizes and thicknesses of components in the drawings are arbitrarily illustrated for convenience of explanation, the following exemplary embodiments are not limited thereto.

Hereinafter, the inventive concept will be described in detail by explaining exemplary embodiments of the inventive concept with reference to the attached drawings. Like reference numerals in the drawings denote like elements, and repeated descriptions thereof will be omitted.

Figure 2:
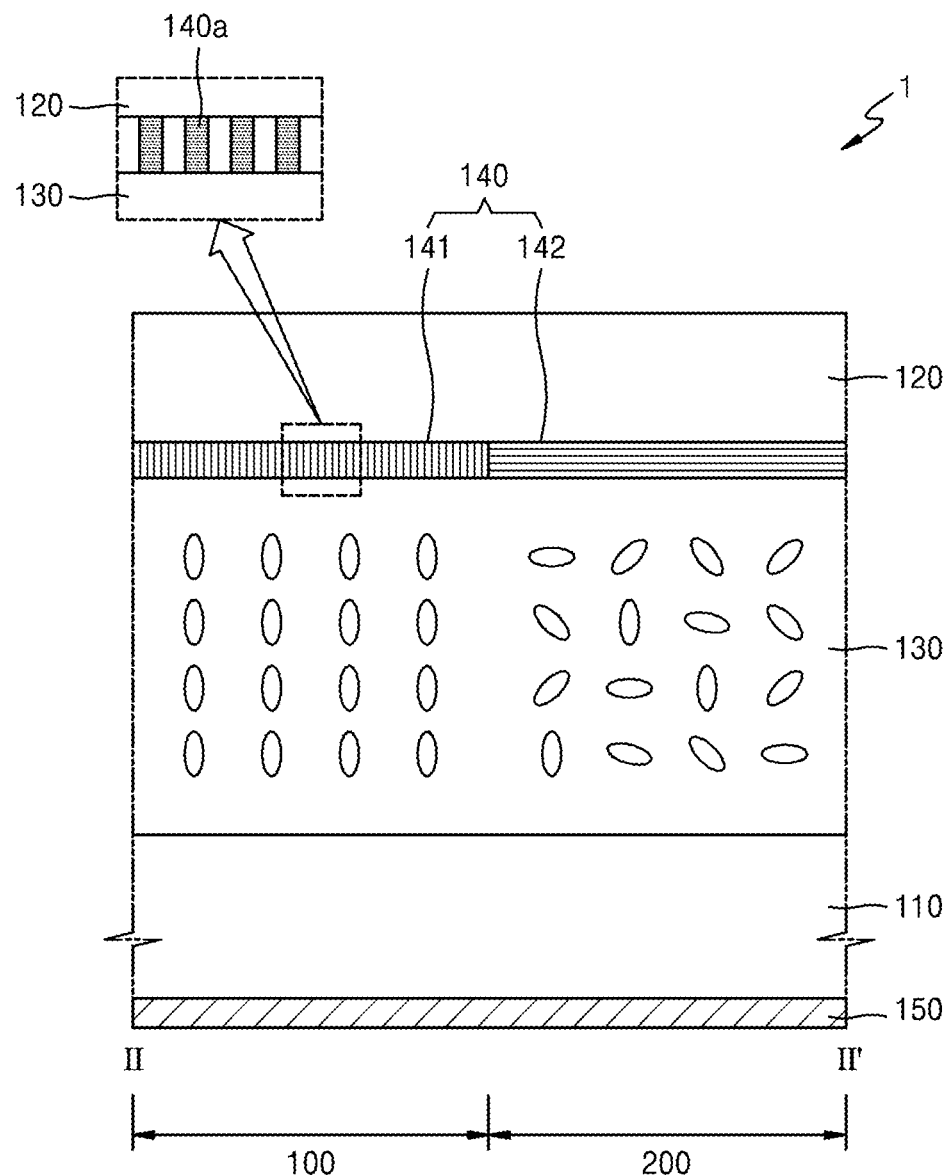
FIG. 2 is a cross-sectional view taken along a line II-II' of FIG. 1A.

FIG. 1A is a schematic plan view of a liquid crystal display (LCD) apparatus 1 according to an exemplary embodiment, and FIG. 2 is a cross-sectional view taken along a line II-II' of FIG. 1A.

Referring to FIGS. 1 and 2, the LCD apparatus 1 may include a first substrate 110 having first regions 100 realizing an image and second regions 200 via which external light passes, a second substrate 120 facing the first substrate 110, a liquid crystal layer 130 disposed between the first substrate 110 and the second substrate 120, a first polarizer 150 disposed on a surface of the first substrate 110, and a second polarizer 140 disposed between the second substrate 120 and the liquid crystal layer 130 and including a first polarization region 141 corresponding to the first region 100 and a second polarization region 142 corresponding to the second region 200 and having a polarization axis different from a polarization axis of the first polarization region 141.

The first substrate 110 and the second substrate 120 may be transparent substrates formed of glass or plastics, and the LCD apparatus 1 may be a see-through LCD apparatus via which a user may view an image realized by the LCD apparatus 1 as well as an external background.

The first regions 100 and the second regions 200 may be alternately arranged along a first direction (an X direction). The first regions 100 are arranged in a second direction (a Y direction) substantially perpendicular to the first direction and each of the first regions 100 may include a first sub-pixel Psr, a second sub-pixel Psg, and a third sub-pixel Psb which respectively emit different colors of light. The first sub-pixel Psr, the second sub-pixel Psg, and the third sub-pixel Psb may respectively emit red, green, and blue light, but the inventive concept is not limited thereto. The different colors of light may be designated by color filters (not shown) or color conversion layers which are arranged to respectively correspond to the first to third sub-pixels Psr, Psg, and Psb, and each of the first to third sub-pixels Psr, Psg, and Psb may be separated by a black matrix (not shown).

The second region 200 may be arranged between the first region 100 arranged in one row and the first region 100 arranged in different row, and color filters and a black matrix may not be positioned in the second regions 200. Each second region 200 transmits external light without displaying an image, and transparency of an entire portion of the LCD apparatus 1 may be improved by arranging the second regions 200 having a high transmittance.

The first polarizer 150 may be arranged on a surface of the first substrate 110, and may be arranged on an entire portion of the LCD apparatus 1. That is, the first polarizer 150 may be arranged on the first regions 100 as well as the second regions 200 of the LCD apparatus 1, and may be a conventional polarizer such as a film type polarizer. However, the inventive concept is not limited thereto, and the first polarizer 150 may be arranged between the first substrate 110 and the liquid crystal layer 130 and may be, for example, a wire-grid polarizer (WGP).

The first polarizer 150 may have a polarization axis of certain direction, and light passing through the first polarizer 150 may be converted into light polarized in a direction parallel to the polarization axis of the first polarizer 150.

The second polarizer 140 may be arranged between the second substrate 120 and the liquid crystal layer 130 and may include the first polarization region 141 positioned so that it overlaps with the position of the first region 100 and the second polarization region 142 positioned so that it overlaps with the position of the second region 200 and having a polarization axis different from a polarization axis of the first polarization region 141. The polarization axis of the first polarization region 141 may be substantially perpendicular to the polarization axis of the second polarization region 142, and a polarization axis of the first polarizer 150 may be substantially parallel to the polarization axis of the second polarization region 142.

Light incident from a source external to the first substrate 110 passes through the first polarizer 150 and may be converted into light polarized in the polarization axis of the first polarizer 150. The light incident from the outside may be light incident from backlight or may be natural light.

In an optical path of the first region 100, light passing through the first polarizer 150 passes through the first substrate 110 and the liquid crystal layer 130 and then may be incident to the first polarization region 141 of the second polarizer 140. When there is no phase retardation caused by the liquid crystal layer 130, because the polarization axis of the first polarization region 141 is substantially perpendicular to the polarization axis of the first polarizer 150, the light incident to the first polarization region 141 may not pass through the first polarization region 141.

In the case in which the liquid crystal layer 130 does cause a phase retardation of light passing through the first polarizer 150, the first substrate 110 and the liquid crystal layer 130, a polarization axis of the light passing through the first polarizer 150 is rotated 90 degrees due to the phase retardation caused by the liquid crystal layer 130, and the light passing through the liquid crystal layer 130 may pass through the first polarization region 141 and then may be emitted to the exterior of the LCD apparatus. The liquid crystal layer 130 may be aligned in a certain direction due to an electric field, and the phase retardation may be caused by the alignment of the liquid crystal layer 130.

Although not illustrated, two electrodes (not shown) for applying an electric field to the liquid crystal layer 130 and color filters (not shown) for providing a red, green, or blue color to the incident light may be arranged in the first regions of the first to third sub-pixels Psr, Psg, and Psb.

In an optical path in the second region 200, light passing through the first polarizer 150 passes through the first substrate 110 and the liquid crystal layer 130 and then may be incident to the second polarization region 142 of the second polarizer 140. If the phase retardation is not caused by the liquid crystal layer 130, because the polarization axis of the second polarization region 142 is substantially the same as the polarization axis of the first polarizer 150, light incident to the second polarization region 142 passes through the second polarization region 142 and may be emitted to the exterior of the LCD apparatus.

The second region 200 does not display an image and is used to improve the transmittance of the LCD apparatus 1, and in the second region 200, at least one of the two electrodes (not shown) used to apply the electric field to the liquid crystal layer 130 may not be arranged. That is, the liquid crystal layer 130 corresponding to the second region 200 does not function as a phase retarder, and a polarization axis of light passing through the first polarizer 150 does not change due to the liquid crystal layer 130. Thus, the light may directly pass through the second polarization region 142.

The transmittance of the LCD apparatus 1 may be improved by improving the transmittance of the second regions 200.

The second polarizer 140 may be, for example, a wire-grid polarizer (WGP). The WGP may be formed of a regular array in which fine metal wires 140a are arranged in parallel. A WGP performs the same functions as a conventional polarizer, but may be easily patterned because the WGP is formed by arranging metal wires 140a at intervals smaller than a wavelength of light without performing orientation for materials. The first polarization region 141 and the second polarization region 142 of the second polarizer 140 may be easily formed by patterning the same through photolithography. The formation of the first polarization region 141 and the second polarization region 142 will be described later.

Figure 1B:
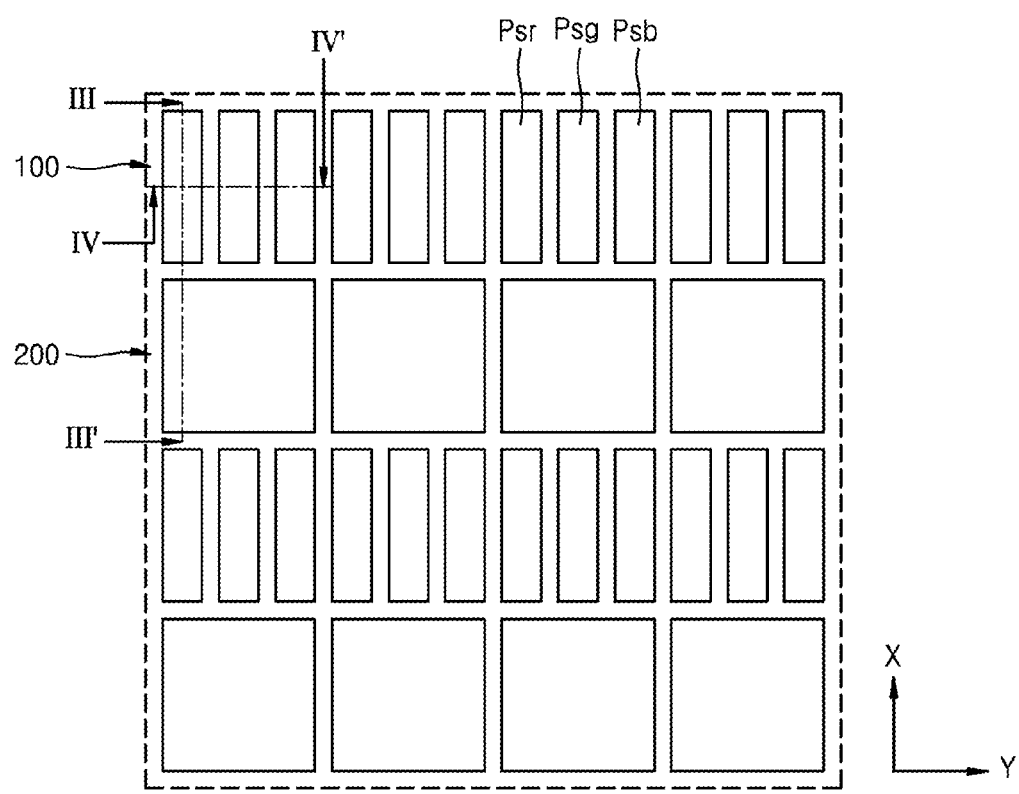
FIG. 1B is a schematic plan view of a liquid crystal display (LCD) apparatus according another exemplary embodiment.
Figure 3:
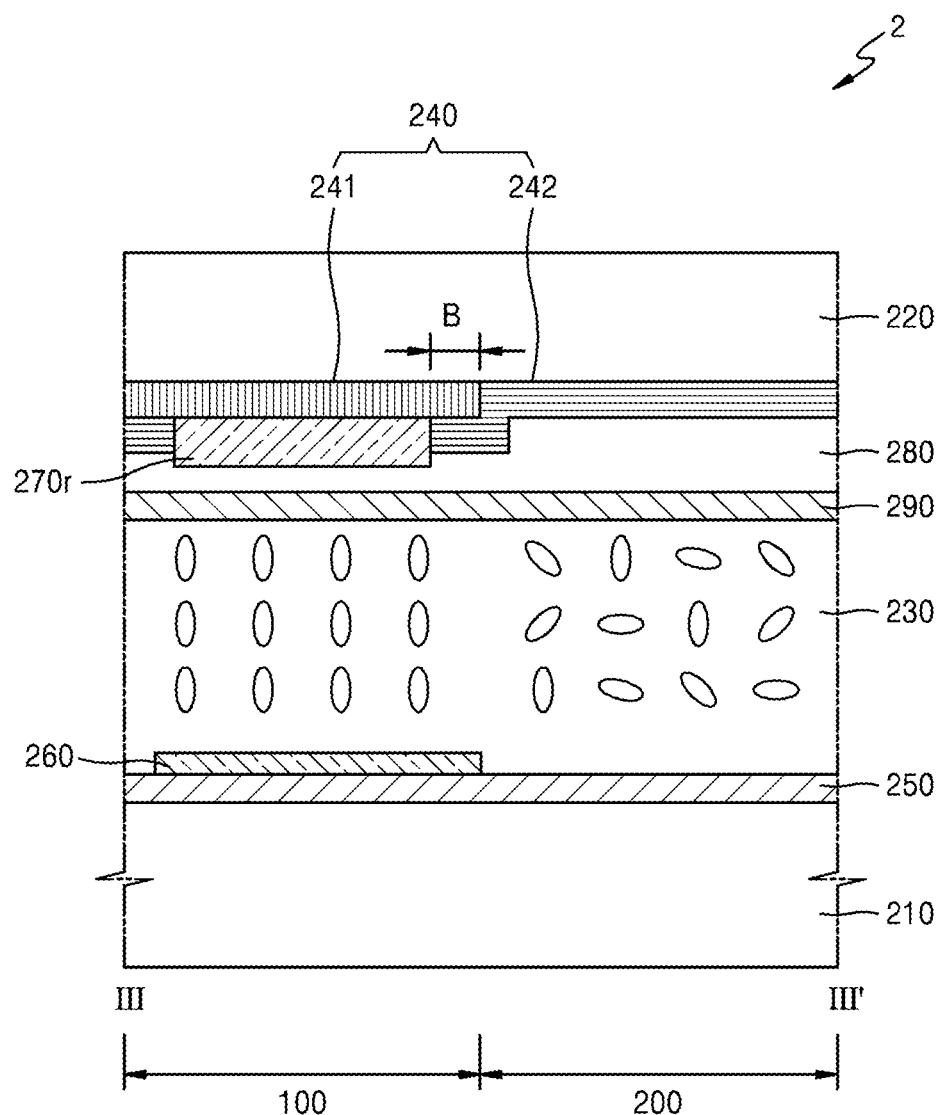
FIG. 3 is a cross-sectional view taken along a line III-III' of FIG. 1B.
Figure 4:
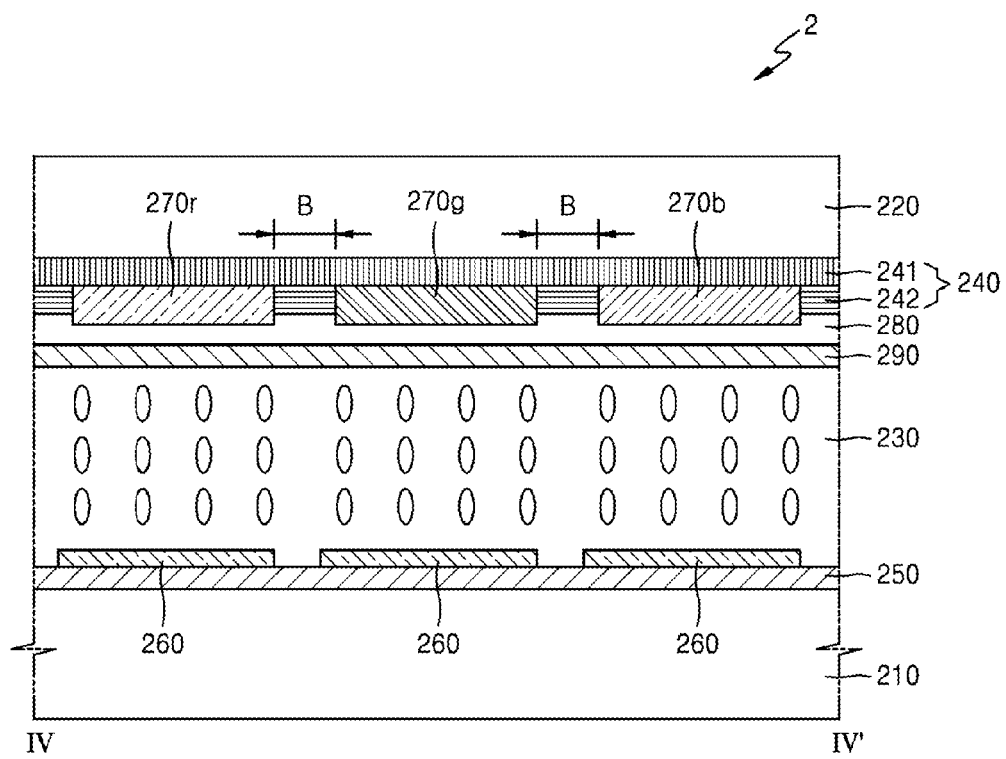
FIG. 4 is a cross-sectional view taken along a line IV-IV' of FIG. 1B.

FIG. 1B is a schematic plan view of a liquid crystal display (LCD) apparatus 1 according to another exemplary embodiment, and FIG. 3 and FIG. 4 illustrate another embodiment of the LCD according to the disclosure showing another arrangement of the LCD components than shown in FIG. 2. FIG. 3 is a cross-sectional view taken along a line III-III' of FIG. 1B, and FIG. 4 is a cross-sectional view taken along a line IV-IV' of FIG. 1B.

Referring to FIG. 3, an LCD apparatus 2 may include a first substrate 210 including a first region 100 realizing an image and a second region 200 transmitting light, a second substrate 220 facing the first substrate 210, a liquid crystal layer 230 disposed between the first substrate 210 and the second substrate 220, a first polarizer 250 arranged on a surface of the first substrate 210, and a second polarizer 240 arranged between the second substrate 220 and the liquid crystal layer 230 and having a first polarization region 241 positioned to overlap with the position of the first region 100 and a second polarization region 242 positioned to overlap with the position of the second region 200 and having a polarization axis different from a polarization axis of the first polarization region 241.

The first substrate 210 and the second substrate 220 may be substrates formed of glass, plastics, or the like, and the LCD apparatus 2 may be a see-through LCD apparatus via which the user may view an image realized by the LCD apparatus 2 as well as an external background.

The second region 200 may be arranged between the first region 100 arranged in one row and the first region 100 arranged in another row, and color filters (not shown) and a black matrix (not shown) may not be included in the second regions 200. The second region 200 transmits external light without displaying an image, and transparency of an entire portion of the LCD apparatus 2 may be improved by arranging the second regions 200 having a high transmittance.

The first polarizer 250 may be arranged between the first substrate 210 and the liquid crystal layer 230, and may be arranged on an entire portion of the LCD apparatus 2. That is, the first polarizer 250 may be arranged on the first region 100 as well as the second region 200 of the LCD apparatus 2 and may be a conventional polarizer that is of a film type.

The first polarizer 250 may have a polarization axis in a certain direction, and light passing through the first polarizer 250 may be converted into light polarized in the same direction as the polarization axis of the first polarizer 250.

The second polarizer 240 may be arranged between the second substrate 220 and the liquid crystal layer 230, and may include the first polarization region 241 positioned to correspond to the position of the first region 100 and the second polarization region 242 positioned to correspond to the position of the second region 200 and having a polarization axis different from a polarization axis of the first polarization region 241. The polarization axis of the first polarization region 241 may be substantially perpendicular to the polarization axis of the second polarization region 242, and the polarization axis of the first polarizer 250 may be substantially parallel to the polarization axis of the second polarization region 242. The second polarizer 240 may be, for example, a WGP.

Light incident from the outside of the first substrate 210 passes through the first substrate 210 and the first polarizer 250, and may be converted into light polarized in the polarization axis of the first polarizer 250. The light incident from the outside may be light incident from a backlight unit or may be natural light.

In an optical path of the first region 100, light passing through the first polarizer 250 passes through the first substrate 210 and the liquid crystal layer 230, and then may be incident to the first polarization region 241 of the second polarizer 240. When there is no phase retardation caused by the liquid crystal layer 230, because the polarization axis of the first polarization region 241 is substantially perpendicular to the polarization axis of the first polarizer 250, the light incident to the first polarization region 241 may not pass through the first polarization region 241.

In the case in which the liquid crystal layer 230 does cause a phase retardation of light passing through the first polarizer 250, the first substrate 210 and the liquid crystal layer 230, a polarization axis of the light passing through the first polarizer 250 is rotated 90 degrees due to the phase retardation caused by the liquid crystal layer 230, and the light passing through the liquid crystal layer 230 may pass through the first polarization region 241 and then may be emitted to the exterior of the LCD apparatus. The liquid crystal layer 230 may be aligned in a certain direction due to an electric field, and the phase retardation may be caused by the alignment of the liquid crystal layer 230.

A pixel electrode 260 and a common electrode 290 for applying the electric field to the liquid crystal layer 230, and a color filter 270r may be arranged in the first region 100. The pixel electrode 260 and the common electrode 290 may be transparent electrodes. According to an exemplary embodiment, the pixel electrode 260 is arranged between the first substrate 210 and the liquid crystal layer 230, the common electrode 290 is arranged between the second substrate 220 and the liquid crystal layer 230, and the color filter 270r may be arranged between the second polarizer 240 and the liquid crystal layer 230. An over-coating layer 280 covering the color filter 270r may be further arranged on the second polarizer 240. However, the inventive concept is not limited thereto, and according to a mode of an LCD apparatus, locations and types of the pixel electrode 260 and the common electrode 290 may vary, and locations of the color filter 270r (which may, alternatively, be blue or green in color) may also vary.

In an optical path in the second region 200, light passing through the first polarizer 250 passes through the first substrate 210 and the liquid crystal layer 230 and then may be incident to the second polarization region 242 of the second polarizer 240. If the phase retardation is not caused by the liquid crystal layer 230, because the polarization axis of the second polarization region 242 is substantially parallel to the polarization axis of the first polarizer 250, light incident to the second polarization region 242 passes through the second polarization region 242 and may be emitted to the exterior.

The second region 200 does not display an image and is used to improve the transmittance of the LCD apparatus 2. It is unnecessary to apply an electric field to the liquid crystal layer 230, and according to an exemplary embodiment, the pixel electrode 260 may not be included in the second region 200.

The liquid crystal layer 230 positioned in the second region 200 does not function as a phase retarder. A polarization axis of light passing through the first polarizer 250 does not change due to the liquid crystal layer 230, and the light may pass through the second polarization region 242.

The second polarizer 240 may include an area B where the first polarization region 241 overlaps the second polarization region 242. The area B may correspond to a boundary line between the first region 100 and the second region 200. When the first polarization region 241 and the second polarization region 242, which have polarization axes that are substantially perpendicular to each other, overlap each other, light incident to the area B may not pass through the area B. That is, the area B may function as a black matrix that blocks light, and thus, it is unnecessary to additionally arrange a black matrix for defining the first region 100 and the second region 200.

Referring to FIG. 4, the LCD apparatus 2 may include the first sub-pixel (Psr of FIG. 1B), the second sub-pixel (Psg of FIG. 1B), and the third sub-pixel (Psb of FIG. 1B) included in the first region 100.

Color filters 270r, 270g, and 270b for respectively providing colors to light incident to the first to third sub-pixels Psr, Psg, and Psb may be arranged, and the first polarization region 241 of the second polarizer 240 may be disposed between the color filters 270r, 270g, and 270b and the second substrate 220. The polarizer used in the second polarization region 242 may also be arranged in an area of the first polarization region 241 where the color filters 270r, 270g, and 270b are not arranged, that is, in spaces between the color filters 270r, 270g, and 270b (area B).

The area B where the first polarization region 241 overlaps the second polarization region 242 may be arranged between the color filters 270r, 270g, and 270b, and when the first polarization region 241 and the second polarization region 242, which have polarization axes that are substantially perpendicular to each other, overlap each other, the light incident to the area B may not pass through the area B.

The area B may prevent color mixing between the first to third sub-pixels Psr, Psg, and Psb and may define the first to third sub-pixels Psr, Psg, and Psb. Due to the configuration of the area B, a black matrix generally arranged to perform the above functions may be omitted.

Figure 5:
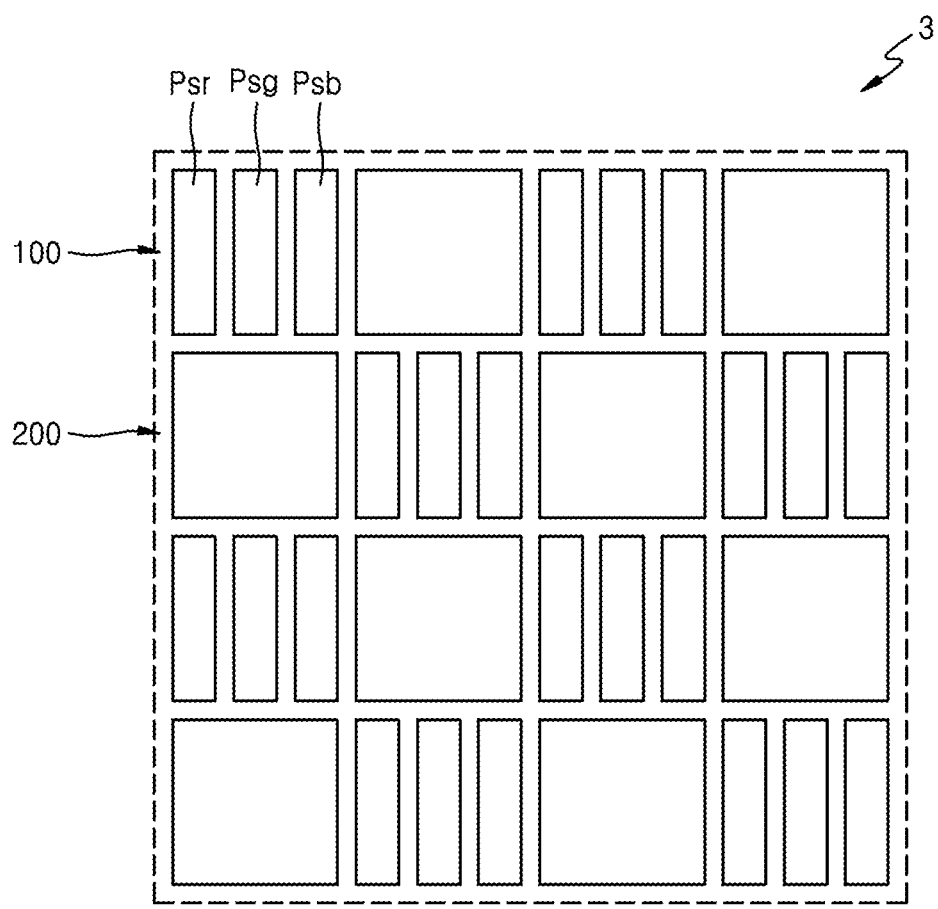
FIG. 5 is a schematic plan view of an LCD apparatus according to an exemplary embodiment.

FIG. 5 is a schematic plan view of an LCD apparatus according to an exemplary embodiment.

Referring to FIG. 5, an LCD apparatus 3 includes a first region 100 realizing an image and a second region passing through external light, and the first region 100 and the second region 200 may be arranged in a checkered pattern.

The first region 100 may include a first sub-pixel Psr, a second sub-pixel Psg, and a third sub-pixel Psb which emit different colors of light. The first sub-pixel Psr, the second sub-pixel Psg, and the third sub-pixel Psb may respectively emit red, green, and blue light, but the inventive concept is not limited thereto. The colors may be provided by color filters (not shown) or color conversion layers (not shown) arranged to respectively correspond to the first sub-pixel Psr, the second sub-pixel Psg, and the third sub-pixel Psb, and each of the first sub-pixel Psr, the second sub-pixel Psg, and the third sub-pixel Psb may be defined by a black matrix (not shown).

The second region 200 does not display an image, but passes external light therethrough, and transparency of the LCD apparatus 3 may be improved by arranging the second region 200 so as to have a high transmittance.

FIGS. 6A to 6D sequentially illustrate a method of forming the second polarizer 140 included in an LCD apparatus of FIG. 2.

Figure 6A:
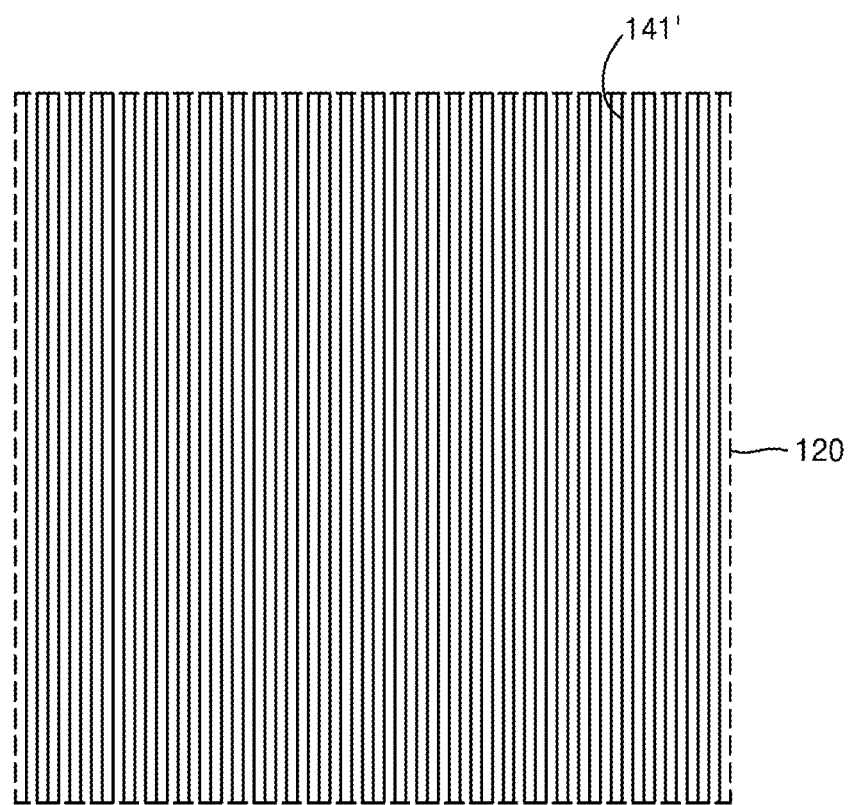
FIGS. 6A, 6B, 6C, and 6D sequentially illustrate a method of forming a second polarizer included in an LCD apparatus of FIG. 2.
Figure 6B:
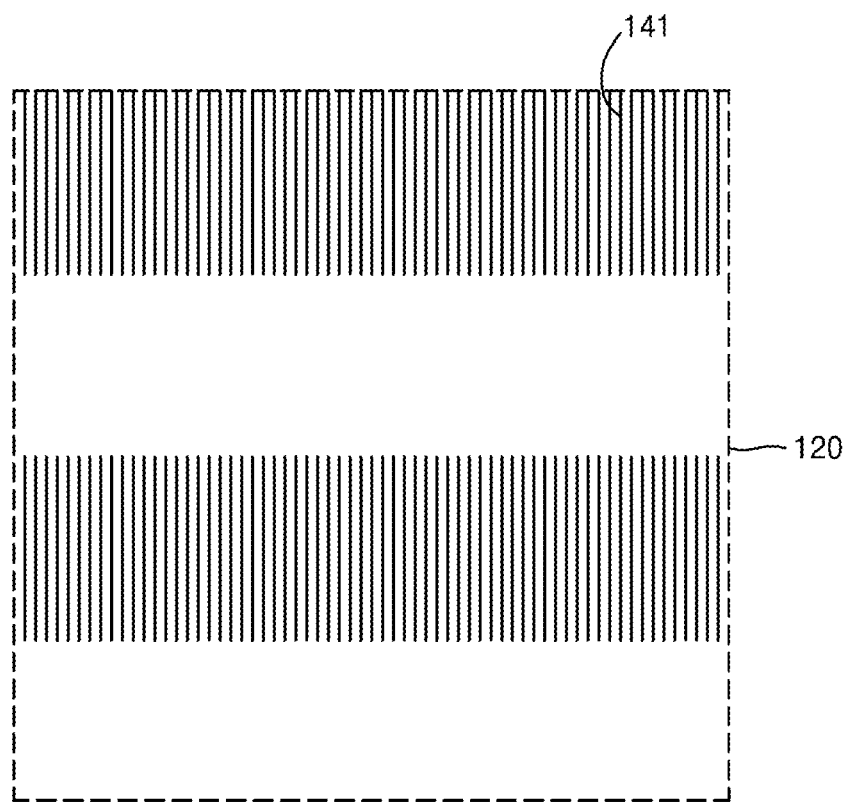
Figure 6C:
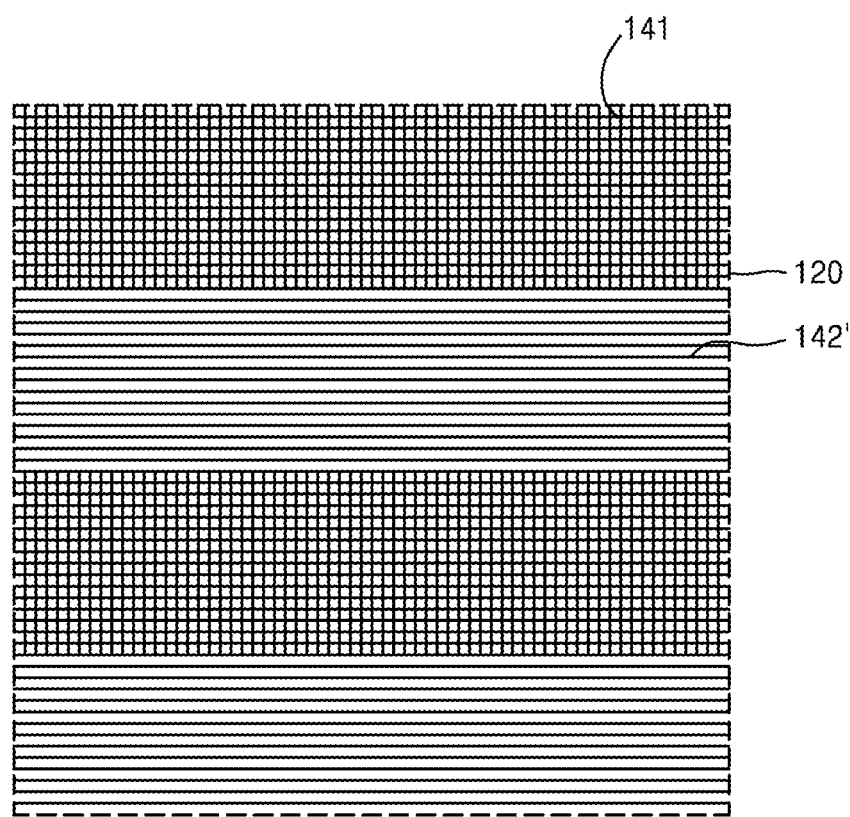
Figure 6D:
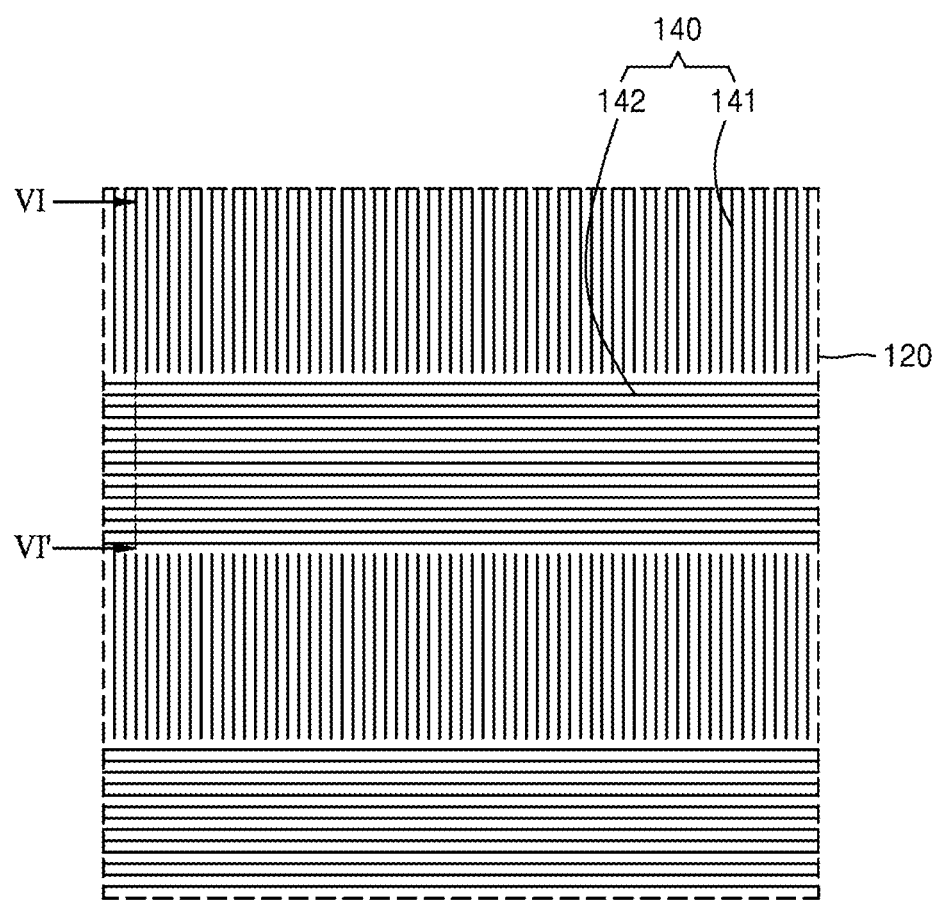

Referring to FIGS. 6A to 6D, operation of forming the second polarizer 140 may include: forming a polarizer 141' having a first polarization axis on an entire portion of the second substrate 120 as shown in FIG. 6A. Forming a first polarization region 141 by patterning the polarizer 141' having the first polarization axis, as shown in FIG. 6B. Forming, over the entire surface of the second substrate 120, a polarizer 142' having a second polarization axis different from the first polarization axis such that the polarizer 142' covers the first polarization region 141, as shown in FIG. 6C. And forming a second polarization region 142 by removing an area of the polarizer 142' having the second polarization axis, wherein the area covers the first polarization region 141, as shown in FIG. 6D.

The polarizer 141' having the first polarization axis and the polarizer 142' having the second polarization axis may be, for example, WGPs, which may be easily patterned, and the first polarization axis may be substantially perpendicular to the second polarization axis.

The polarizer 141' having the first polarization axis and the polarizer 142' having the second polarization axis may be easily patterned through a photolithographic etching process, and the first polarization region 141 and the second polarization region 142 which are patterned may respectively be positioned to correspond to positions of the first region 100 and the second region, respectively, of the first substrate (110 of FIG. 2).

Figure 7A:
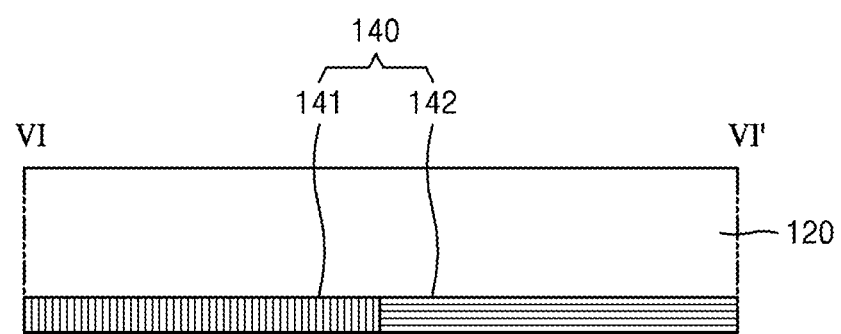
FIGS. 7A and 7B sequentially illustrate some processes of a method of manufacturing an LCD apparatus of FIG. 2.
Figure 7A:
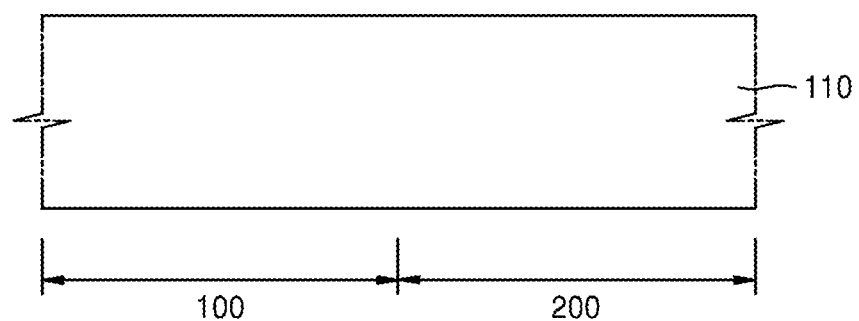
Figure 7B:
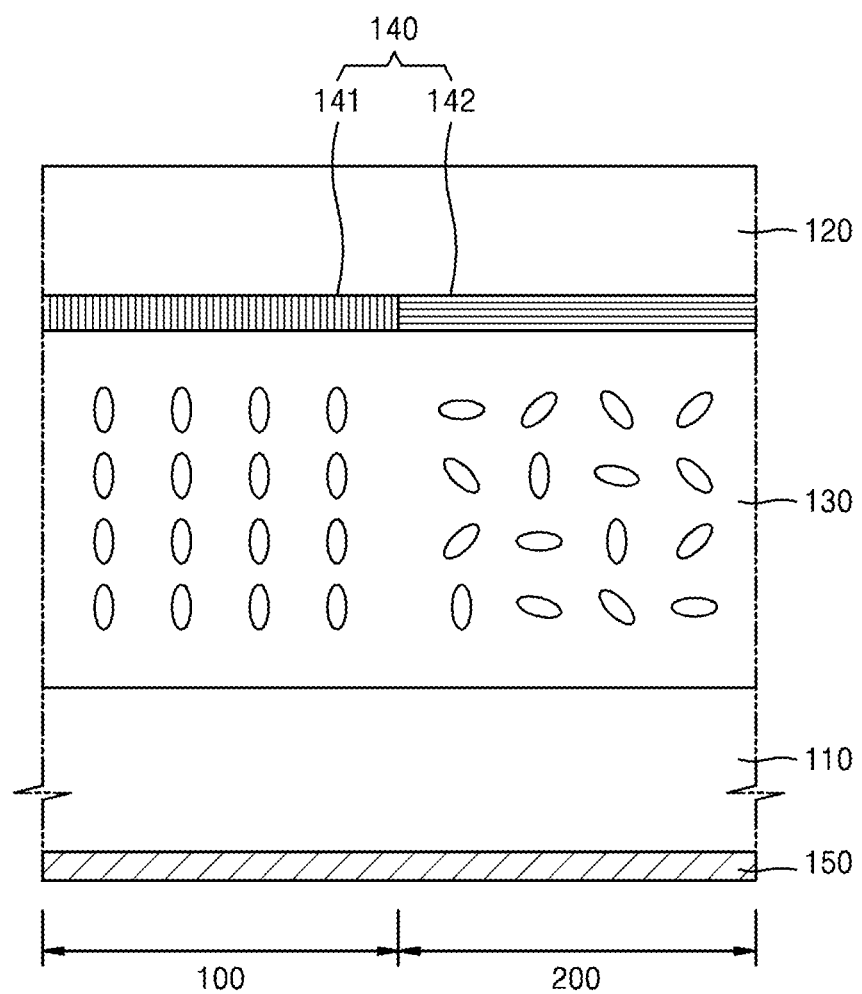

FIGS. 7A to 7B sequentially illustrate a method of manufacturing the LCD apparatus of FIG. 2.

Referring to FIGS. 7A and 7B, a method of manufacturing the LCD apparatus of FIG. 2 may include: arranging a first substrate 110 including a first region 100 realizing an image and a second region 200 passing external light therethrough; forming, on a second substrate 120, a second polarizer 140 including a first polarization region 141 and a second polarization region 142 having a polarization axis that is substantially perpendicular to the first polarization region 141; and aligning and attaching the first substrate 110 and the second substrate 120 so that the second polarizer 140 faces the first substrate 110 and each of the first polarization region 141 and the second polarization region 142 corresponds to each of the first region 100 and the second region 200.

The second polarizer 140 may be formed through processes of FIGS. 6A to 6D, and referring to FIG. 7A, the first substrate 110 and the second substrate 120 may be attached to each other by a sealant (not shown) after the first substrate 110 and the second substrate 120 including the second polarizer 140 are aligned.

Referring to FIG. 7B, after a liquid crystal layer 130 is formed by injecting liquid crystals into an area sealed by the first substrate 110 and the second substrate 120, the first polarizer 150 may be formed on a surface of the first substrate 110. In other words, the first polarizer 150 may be formed on a surface of the first substrate 110 after attaching the first substrate 110 and the second substrate 120.

However, the inventive concept is not limited thereto, and according to an exemplary embodiment, the first polarizer 150 may be formed on a surface of the first substrate 110 before attaching the first substrate 110 and the second substrate 120.

The first polarizer 150 may be of a film type and may have a polarization axis that is substantially parallel to a polarization axis of the second polarization region 142.

Figure 8:
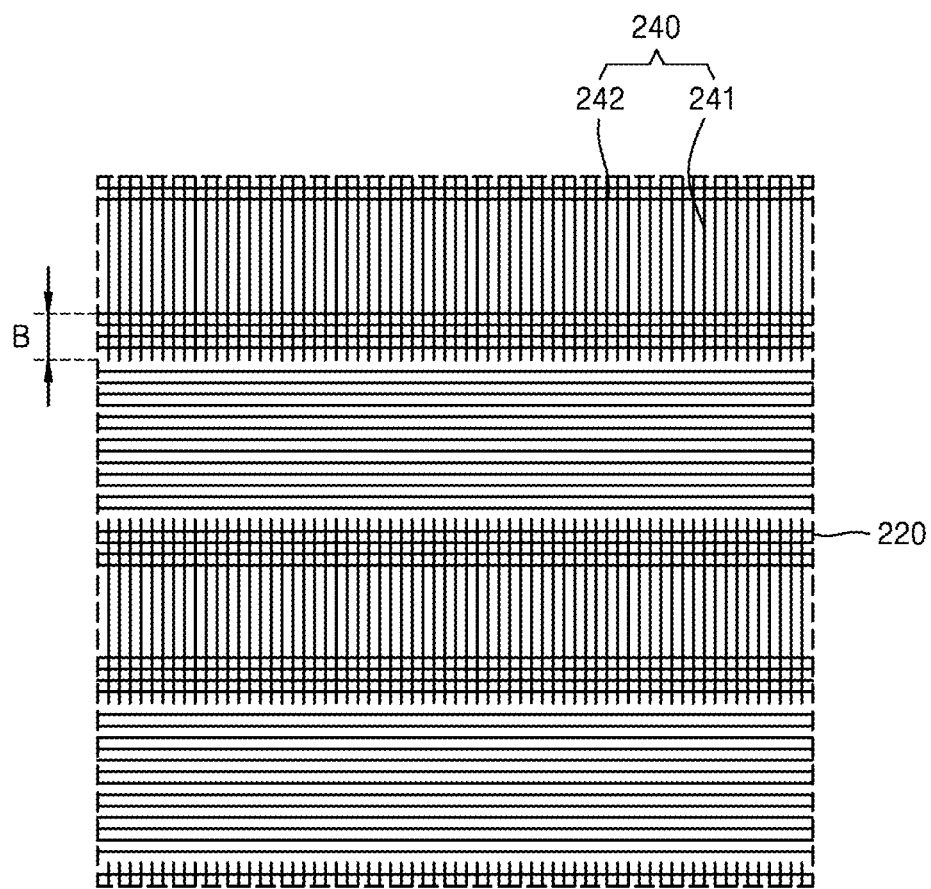
FIG. 8 is a schematic plan view of a second polarizer included in an LCD apparatus of FIG. 3, according to an exemplary embodiment.

FIG. 8 is a schematic plan view of the second polarizer 240 included in an LCD apparatus 2 of FIG. 3, according to an exemplary embodiment.

Referring to FIG. 8, the second polarizer 240 including the first polarization region 241 and the second polarization region 242 may be arranged on the second substrate 220 and may include the area B where the first polarization region 241 overlaps the second polarization region 242.

A method of forming the second polarizer 240 may be the same as the method described with reference to FIGS. 6A to 6C and may further include forming the second polarization region 242 such that at least some portions of the region which covers the first polarization region 241 are not removed.

That is, the second polarizer 240 may be easily formed by adjusting an opening of a mask used to form the second polarization region 242.

Figure 9:
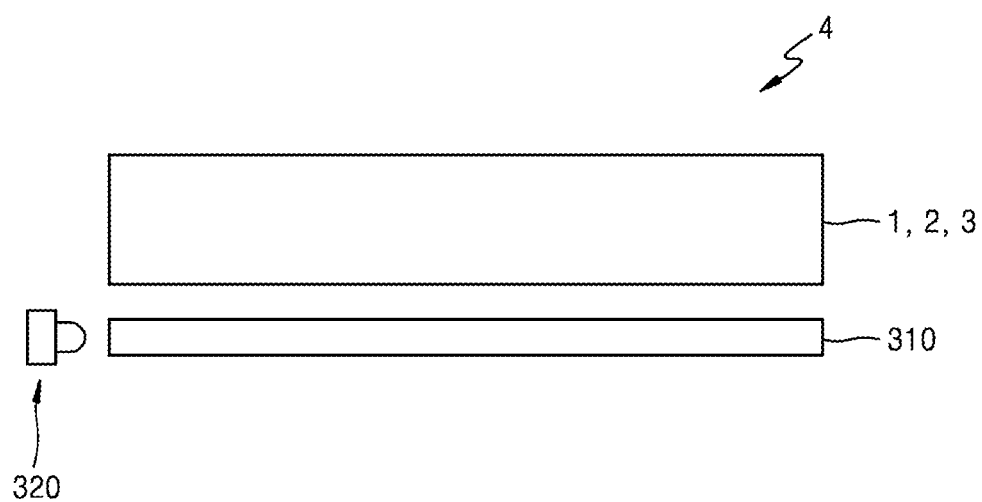
FIG. 9 is a schematic cross-sectional view of an LCD apparatus according to an exemplary embodiment.

FIG. 9 is a schematic cross-sectional view of an LCD apparatus 4 according to an exemplary embodiment.

Referring to FIG. 9, the LCD apparatus 4 may further include a light guide panel 310 arranged on a surface of the first substrates 110 and 210 opposite to a surface facing the second substrates 120 and 220 included in the LCD apparatuses 1, 2, and 3, and a light source unit 320 for providing light to the light guide panel 310.

The light source unit 320 is arranged to face a side surface of the light guide panel 310, and the light guide panel 310 may be formed of a transparent material. The light source unit 320 may be a light-emitting diode (LED), or the like and may emit white light. However, the inventive concept is not limited thereto, and when the LCD apparatus 4 includes color conversion layers formed of fluorescent substances, instead of color filters, the light source unit 320 may emit blue light.

Light emitted from the light source unit 320 may be incident onto the light guide panel 310, and the light that is evenly spread onto a large area of the light guide panel 310 and may be irradiated onto the first substrates 110 and 210. When an image is not displayed, or when ambient light is strong, the light source unit 320 may be turned off. When an image is displayed by only using ambient light, the light source unit 320 may transmit the ambient light and may remain transparent. When ambient light is too weak, the light source unit 320 may be turned on, and thus, the LCD apparatus 4 may implement an image.

As described above, according to the one or more of the above exemplary embodiments, a see-through LCD apparatus having an improved transmittance and a method of easily manufacturing the same are provided. However, the scope of the inventive concept is not limited thereto.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the disclosure, including the following claims.

What is claimed is:

1. A liquid crystal display (LCD) apparatus comprising:
a first substrate comprising a first region realizing an image and a second region which transmits external light;
a second substrate facing the first substrate;
a liquid crystal layer disposed between the first substrate and the second substrate;
a first polarizer arranged on a surface of the first substrate; and
a second polarizer arranged between the second substrate and the liquid crystal layer and comprising a first polarization region positioned in the first region and a second polarization region positioned in the second region and having a polarization axis different from a polarization axis of the first polarization region.

2. The LCD apparatus of claim 1, wherein a polarization axis of the first polarization region is substantially perpendicular to a polarization axis of the second polarization region.

3. The LCD apparatus of claim 2, wherein the polarization axis of the first polarizer is substantially parallel to the polarization axis of the second polarization region.

4. The LCD apparatus of claim 2, wherein the second polarizer comprises a wire-grid polarizer (WGP).

5. The LCD apparatus of claim 1, wherein the second polarizer comprises a region where the first polarization region overlaps the second polarization region.

6. The LCD apparatus of claim 5, wherein the region where the first polarization region overlaps the second polarization region corresponds to a boundary line between the first region and the second region.

7. The LCD apparatus of claim 5, further comprising color filters respectively arranged in a first sub-pixel, a second sub-pixel, and a third sub-pixel and converting incident light into different colored light, wherein the first sub-pixel, the second sub-pixel, and the third sub-pixel are included in the first region.

8. The LCD apparatus of claim 7, wherein the region where the first polarization region overlaps the second polarization region corresponds to a region between the color filters.

9. The LCD apparatus of claim 7, wherein the color filters are arranged between the second polarizer and the liquid crystal layer.

10. The LCD apparatus of claim 1, wherein the first region and the second region are alternately arranged in one direction.

11. The LCD apparatus of claim 1, wherein the first region and the second region are arranged in a checkered pattern.

12. The LCD apparatus of claim 1, further comprising a pixel electrode and a common electrode which generate an electric field in the liquid crystal layer,
wherein the pixel electrode is not arranged in the second region.

13. The LCD apparatus of claim 1, further comprising a light guide panel arranged on a surface opposite to a surface of the first substrate which faces the second substrate, and a light source unit configured to emit light toward the light guide panel.

14. The LCD apparatus of claim 13, wherein the light source unit is arranged to face a side surface of the light guide panel, and
the light guide panel is formed of a material which transmits light.

* * * * *